(12) United States Patent
Gotou

(10) Patent No.: US 9,581,846 B2
(45) Date of Patent: Feb. 28, 2017

(54) DISPLAY DEVICE AND TELEVISION DEVICE

(71) Applicant: Sharp Kabushiki Kaisha, Osaka-shi, Osaka (JP)

(72) Inventor: Akira Gotou, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 130 days.

(21) Appl. No.: 14/410,694

(22) PCT Filed: Jul. 5, 2013

(86) PCT No.: PCT/JP2013/068479
§ 371 (c)(1),
(2) Date: Dec. 23, 2014

(87) PCT Pub. No.: WO2014/010522
PCT Pub. Date: Jan. 16, 2014

(65) Prior Publication Data
US 2015/0146111 A1 May 28, 2015

(30) Foreign Application Priority Data
Jul. 13, 2012 (JP) ................................. 2012-157567

(51) Int. Cl.
*G02F 1/1333* (2006.01)
*F21V 8/00* (2006.01)
*H04N 9/12* (2006.01)

(52) U.S. Cl.
CPC ....... *G02F 1/133308* (2013.01); *G02B 6/005* (2013.01); *G02B 6/0088* (2013.01);
(Continued)

(58) Field of Classification Search
CPC ... G02F 1/133308; G02F 2001/133322; G02F 2001/133314; G02F 2001/13332;
(Continued)

(56) References Cited

U.S. PATENT DOCUMENTS 6,392,724 B2 * 5/2002 An ................................. 349/58
6,835,961 B2 * 12/2004 Fukayama ........ G02F 1/133308
257/84
(Continued)

FOREIGN PATENT DOCUMENTS

| CN | 102265086 A | 11/2011 |
|---|---|---|
| CN | 202149421 U | 2/2012 |
| JP | 2007-304279 A | 11/2007 |

*Primary Examiner* — Dennis Y Kim
(74) *Attorney, Agent, or Firm* — Keating & Bennett, LLP

(57) ABSTRACT

A liquid crystal display device includes LEDs, a liquid crystal panel 11, a chassis, a frame 13, positioning ribs 23, and step portions 30. The liquid crystal panel 11 is configured to display using light from the LEDs. The chassis is arranged on an opposite side of the liquid crystal panel 11 from a display surface that is for display. The frame 13 is arranged on the display surface side of the liquid crystal panel 11. The frame 13 holds at least the liquid crystal panel 11 and the LEDs with the chassis such that the liquid crystal panel 11 and the LEDs are sandwiched between the frame 13 and the chassis. The positioning rib 23 having a block-like shape projects from the frame 13 toward the chassis and includes a peripheral surface opposite a peripheral surface of the liquid crystal panel 11 for positioning the liquid crystal panel 11 relative to the display surface direction. The step portion 30 projects from a portion of a distal end surface of the positioning rib 23 toward the chassis so as to form a step. The step portion 30 includes a peripheral surface (the inner surface 30*a*) opposite the peripheral surface of the liquid crystal panel 11. The peripheral surface of the step portion 30 is on the same plane with the peripheral surface of the positioning rib 23 (the inner surface 23*a*) which is opposite the peripheral surface of the liquid crystal panel 11.

10 Claims, 14 Drawing Sheets

(52) U.S. Cl.
CPC ............. *G02F 1/1333* (2013.01); *H04N 9/12* (2013.01); *G02F 2001/13332* (2013.01); *G02F 2001/133314* (2013.01); *G02F 2001/133322* (2013.01); *G02F 2201/46* (2013.01)

(58) Field of Classification Search
CPC ... G02F 1/1333; G02F 2201/46; G02B 6/005; G02B 6/0088; H04N 9/12
See application file for complete search history.

(56) References Cited

U.S. PATENT DOCUMENTS

| | | | | |
|---|---|---|---|---|
| 7,333,163 | B2* | 2/2008 | Huang | G02F 1/133308 349/58 |
| 7,443,460 | B2* | 10/2008 | Park | G02B 6/0086 349/58 |
| 8,325,291 | B2* | 12/2012 | Oh | G02F 1/133308 345/87 |
| 2006/0061537 | A1* | 3/2006 | Yu | G02B 6/0088 345/102 |
| 2011/0255015 | A1 | 10/2011 | Kasai | |
| 2013/0155717 | A1* | 6/2013 | Jeong | G02F 1/133308 362/602 |

\* cited by examiner

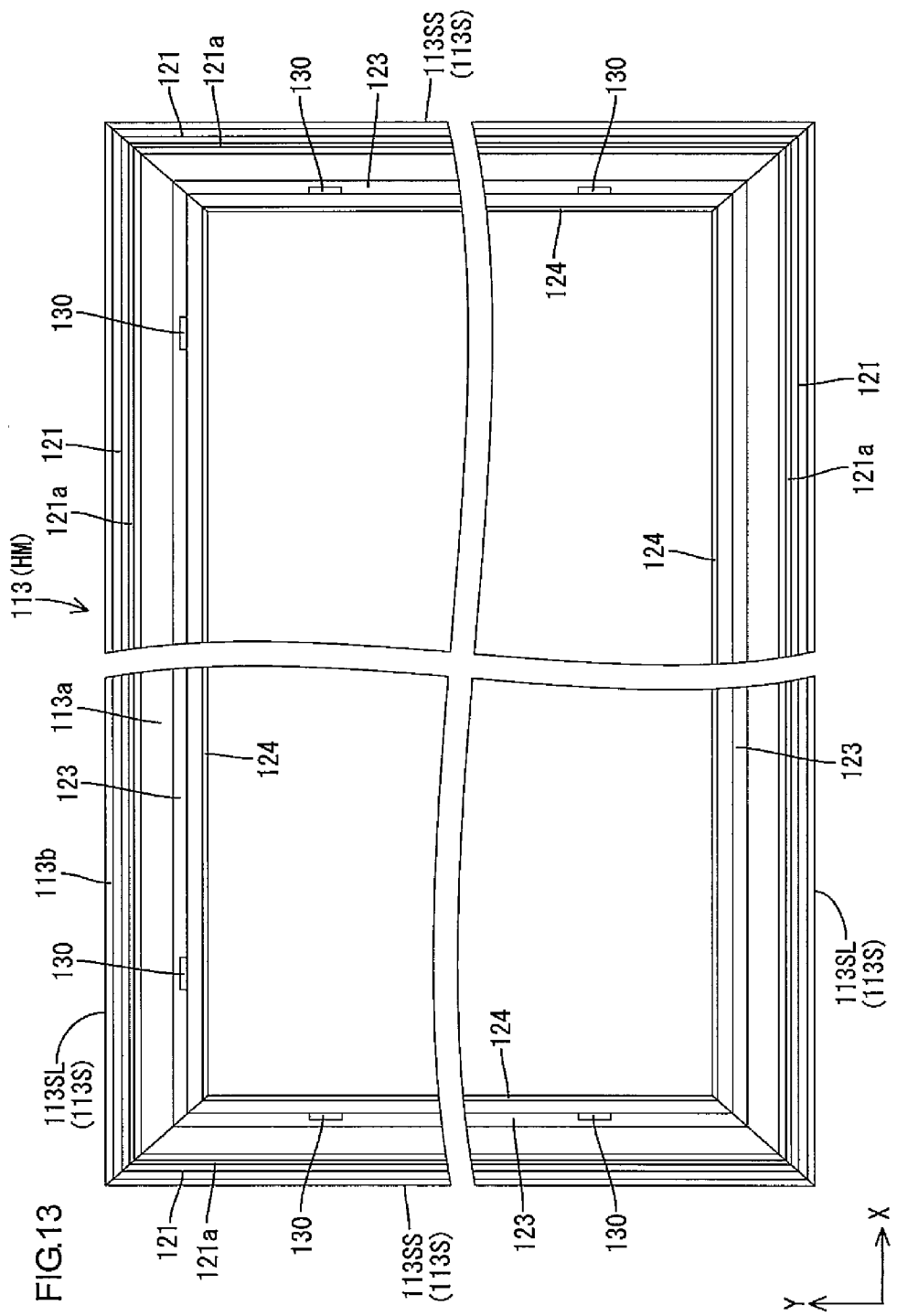

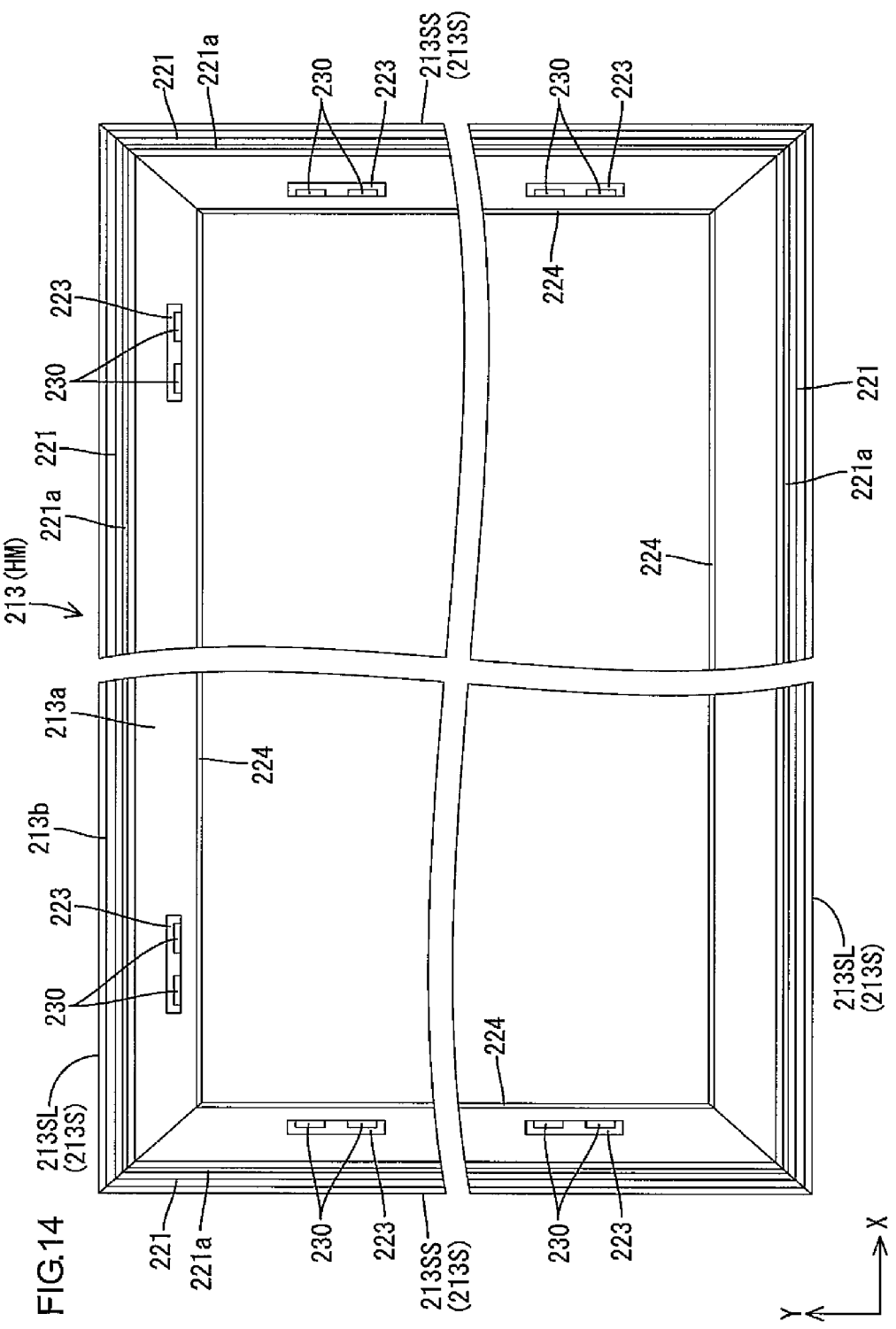

DISPLAY DEVICE AND TELEVISION DEVICE

TECHNICAL FIELD

The present invention relates to a display device and a television device.

BACKGROUND ART

A liquid crystal display device such as a liquid crystal television device requires a backlight unit as a separately provided lighting device because a liquid crystal panel, which is a display panel, does not emit light itself. The backlight unit in such a liquid crystal display device is generally classified into either a direct type or an edge-light type according to a mechanism thereof. It is considered that an edge-light type backlight unit is more preferable for further reduction of the thickness of the liquid crystal display device. The display panel such as an above-described liquid crystal panel is usually arranged in front of the backlight unit on a display side while edges thereof are held by a frame or a frame-like member. A liquid crystal display device including such a frame-like member is disclosed in Patent Document 1.

RELATED ART DOCUMENT

Patent Document

Patent Document 1: Japanese Unexamined Patent Application Publication No. 2007-304279

Problem to be Solved by the Invention

In the liquid crystal display device including the frame-like member, positioning ribs may be formed on the frame-like member for positioning the liquid crystal panel. The liquid crystal panel is positioned with the positioning ribs against which end surfaces of the liquid crystal panel are held. In the production process of the liquid crystal display device, a portion of an edge of the liquid crystal panel may be placed on the positioning rib. If other components are mounted while the edge of the liquid crystal panel is on the positioning rib, a load is exerted on the portion that is placed on the positioning rib. This may result in cracks in a part of the liquid crystal panel.

Disclosure of the Present Invention

A technology disclosed herein was made in view of the above circumstances. An object of the technology described herein is to reduce cracks in a part of a display panel, which may occur in the production process of a display device.

Means for Solving the Problem

A technology disclosed herein relates to a display device including a light source, a display panel, a chassis, a frame, a positioning portion, and a step portion. The display panel is configured to provide a display using light from the light source. The chassis is arranged on an opposite side of the display panel from a display surface of the display panel. The frame is arranged on a display surface side of the display panel and holds at least the display panel and the light source between the frame and the chassis. The positioning portion having a block-like shape projects from the frame toward the chassis and includes a peripheral surface opposite a peripheral surface of the display panel to position the display panel in a display surface direction. The step portion projects from a portion of a distal end surface of the positioning portion toward the chassis and includes a peripheral surface opposite the peripheral surface of the display panel. The peripheral surface of the step portion is on the same plane with the peripheral surface of the positioning portion that is opposite the peripheral surface of the display panel.

According to the above display device, in the production process of the display device, even if the display panel is displaced during positioning thereof to the positioning portion, the edge of the display panel is stopped at the step portion. Therefore, the display panel is less likely to move on the distal end surface of the positioning portion (i.e., the surface that faces the chassis). With this configuration, in the production process of the display device, cracks are less likely to occur in a part of the display panel due to moving of the display panel on the positioning portion.

The display device may further include a light guide plate arranged over an opposite surface of the display panel to the display surface, including a peripheral surface opposite the light source, configured to guide the light from the light source toward the display panel, and including a through hole in a portion corresponding to the step portion in a plan view to arrange the step portion therein.

With this configuration, the step portion is arranged in the through hole of the light guide plate and thus the light guide plate is positioned in the plate surface direction.

A projection dimension of the step portion may be no more than a thickness of the light guide plate.

If the projection dimension of the step portion is larger than the thickness of the light guide plate, the step portion sticks out from the rear surface of the light guide plate through the through hole. In this configuration, it is difficult to arrange the chassis on the rear surface of the light guide plate. In the above configurations, the step portion is arranged within the through hole. Therefore, the chassis is easily arranged on the rear surface of the light guide plate.

The display device may further include an optical member that is sandwiched between the display panel and the light guide plate. The projection dimension of the positioning portion may be equal to a sum of a thickness of the display panel and a thickness of the optical member.

With this configuration, the distal end surface of the positioning portion is in contact with the surface of the light guide plate that faces the display panel. Therefore, the light guide plate is supported by the distal end surface of the positioning portion.

The projection dimension of the step portion may be no less than a thickness of the optical member.

If the thickness of the step portion is too small, the display panel may be displaced and may move on the step portion during positioning of the display panel. With the above-described configurations, the moving of the display panel on the step portion is reduced.

The display panel may have a square shape in a plan view. Each of the positioning portion and the step portion having a rectangular block-like shape may project such that the peripheral surface of each of the positioning portion and the step portion is parallel to the peripheral surface of the display panel.

With this configuration, the peripheral surface of the positioning portion and the edge of the display panel come into contact with each other while the peripheral surface of the positioning portion and the edges of the liquid crystal panel are parallel to each other. Therefore, the display panel is positioned with respect to the positioning portions with high accuracy.

The positioning portion may include a plurality of positioning portions.

With this configuration, the display panel is positioned with high accuracy by the multiple the positioning portions.

The positioning portions may be arranged adjacent to side surfaces of the display panel.

With this configuration, the display panel is properly positioned.

The positioning portion may include a plurality of step portions.

With this configuration, moving of the display panel on the positioning portion is effectively reduced by the multiple step portions.

The technologies described in this specification may be applied to a display device including a display panel configured to provide display using light from the above-described lighting device. A display device that includes a liquid crystal panel as such a display panel may be considered as new and advantageous. Furthermore, a television device including the above-described display device may be considered as new and advantageous.

Advantageous Effect of the Invention

According to the technology disclosed herein, in a production process of a display device, creation of cracks in a part of a display panel is reduced.

BRIEF DESCRIPTION OF THE DRAWINGS

FIG. 13 is a plan view of a frame 113 according to a second embodiment viewed from the rear.

FIG. 14 is a plan view of a frame 213 according to a third embodiment viewed from the rear.

MODE FOR CARRYING OUT THE INVENTION

First Embodiment

A first embodiment will be described with reference to the drawings. A liquid crystal display device 10 according to this embodiment will be described. X-axis, Y-axis and Z-axis are indicated in some drawings. The axes in each drawing correspond to the respective axes in other drawings. The Y-axis direction corresponds to a vertical direction and the X-axis direction corresponds to a horizontal direction. An upper side and a lower side are based on the vertical direction unless otherwise specified.

Figure 1:
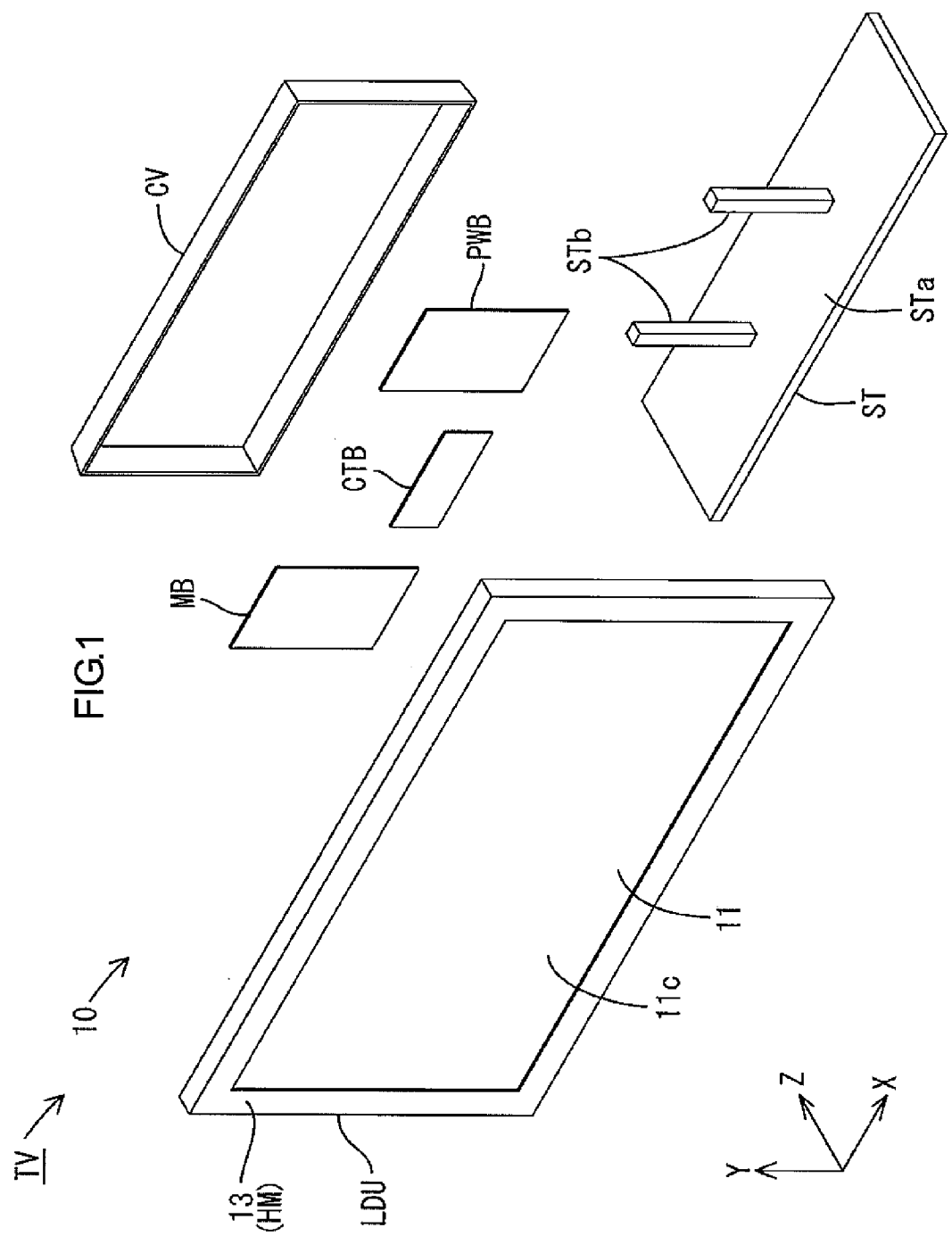
FIG. 1 is an exploded perspective view of a television device TV and a liquid crystal display unit LDU illustrating a schematic configuration thereof according to a first embodiment.
Figure 2:
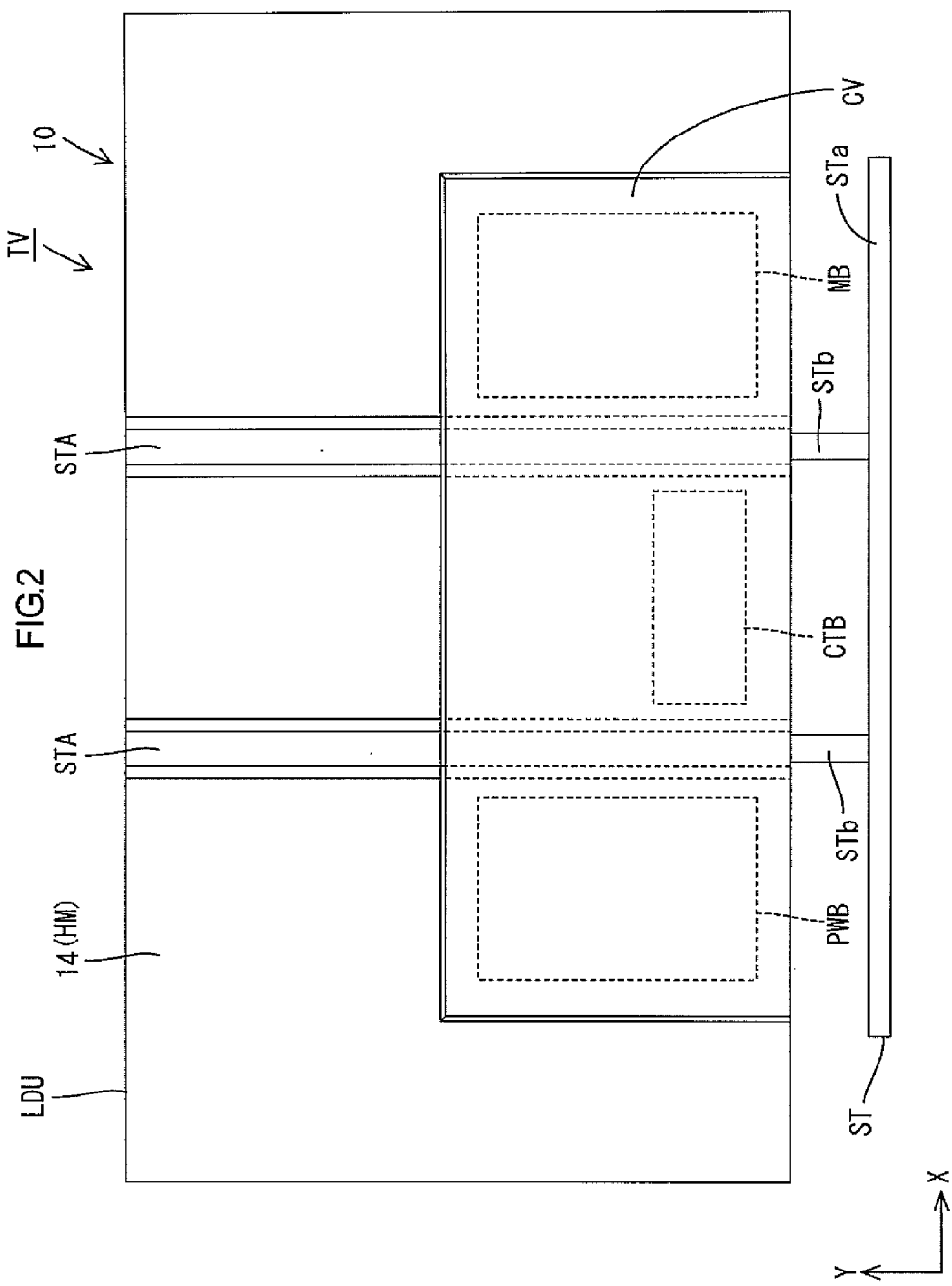
FIG. 2 is a rear view of the television device TV and the liquid crystal display device 10.

A television device TV includes a liquid crystal display unit LDU, boards PWB, MB, and CTB, a cover CV, and a stand ST. The boards PWB, MB, and CTB are attached to a rear surface (aback surface) of the liquid crystal display unit LDU. The cover CV is attached to the rear surface of the liquid crystal display unit LDU so as to cover the boards PWB, MB, and CTB. The stand ST holds the liquid crystal display unit LDU such that a display surface of the liquid crystal display unit LDU extends in the vertical direction (the Y-axis direction). The liquid crystal display device 10 according to this embodiment has the same configuration as the above-described television device TV except for at least a component for receiving television signals (e.g. a tuner included in a main board MB). As illustrated in FIG. 2, the liquid crystal display unit LDU has a landscape rectangular overall shape (rectangular and longitudinal). The liquid crystal display unit LDU includes a liquid crystal panel 11 as a display panel and a backlight device 24 as a light source. The liquid crystal panel 11 and the backlight device 24 are collectively held by a frame 13 and a chassis 14. The frame 13 and the chassis 14 are external members that provide an external configuration of the liquid crystal display device 10. The chassis 14 in this embodiment is one of the components to form the exterior and a part of the backlight device 12.

A configuration of the liquid crystal display device 10 on a rear surface side will be described. As illustrated in FIG. 2, two stand fitting members STA are attached to a rear surface of the chassis 14 that provides an external configuration of the back of the liquid crystal display device 10. The stand fitting members STA are spaced away from each other in an X-axis direction and extend along the Y-axis direction. Each stand fitting member STA has a cross section that corresponds to a cross section of a channel beam and opens to the chassis 14. A space is provided between the stand fitting member STA and the chassis 14. Two support portions STb included in the stand ST are inserted in the respective stand fitting members STA. The space provided in the stand fitting member STA is configured to be a path through which wiring members (e.g. electric wires) connected to an LED board 18 are passed. The LED board 18 is included in the backlight device 12. The stand ST includes a base STa and the support portions STb. The base STa extends parallel to the X-Z plane. The support portions STb stand on the base STa in the Y-axis direction. The cover CV is made of synthetic resin and attached to a part of the rear surface of the chassis 14. Specifically, as illustrated in FIG. 2, the cover CV covers a lower half part of the chassis 14 so as to cross over the stand fitting members STA in the X-axis direction. A component storage space is provided between the cover CV and the chassis 14 such that the boards PWB, MB, and CTB, which will be described next, are arranged therein.

As illustrated in FIG. 2, the boards PWB, MB, and CTB are a power source board PWB, a main board MB, and a control board CTB. The power source board PWB will be referred to as a power supply of the liquid crystal display device 10, which is configured to supply drive power to the other boards MB and CTB and LEDs 17 included in the backlight device 12. Namely, the power source board PWB also serves as "an LED drive board that drives the LEDs 17". The main board MB includes at least a tuner and an image processor, which are not illustrated. The tuner is configured to receive television signals. The image processor performs image processing on the received television signals. The main board MB is configured to output the processed image signals to the control board CTB. If an external image reproducing device, which is not illustrated, is connected to the liquid crystal display device 10, image signals from the image reproducing device are input to the main board MB. The image processor included in the main board MB processes the image signals, and the main board MB outputs the processed image signals to the control board CTB. The control board CTB is configured to convert the image signals, which is sent from the main board, to driving signals for liquid crystals and to supply the driving signals to the liquid crystal panel 11.

Figure 3:
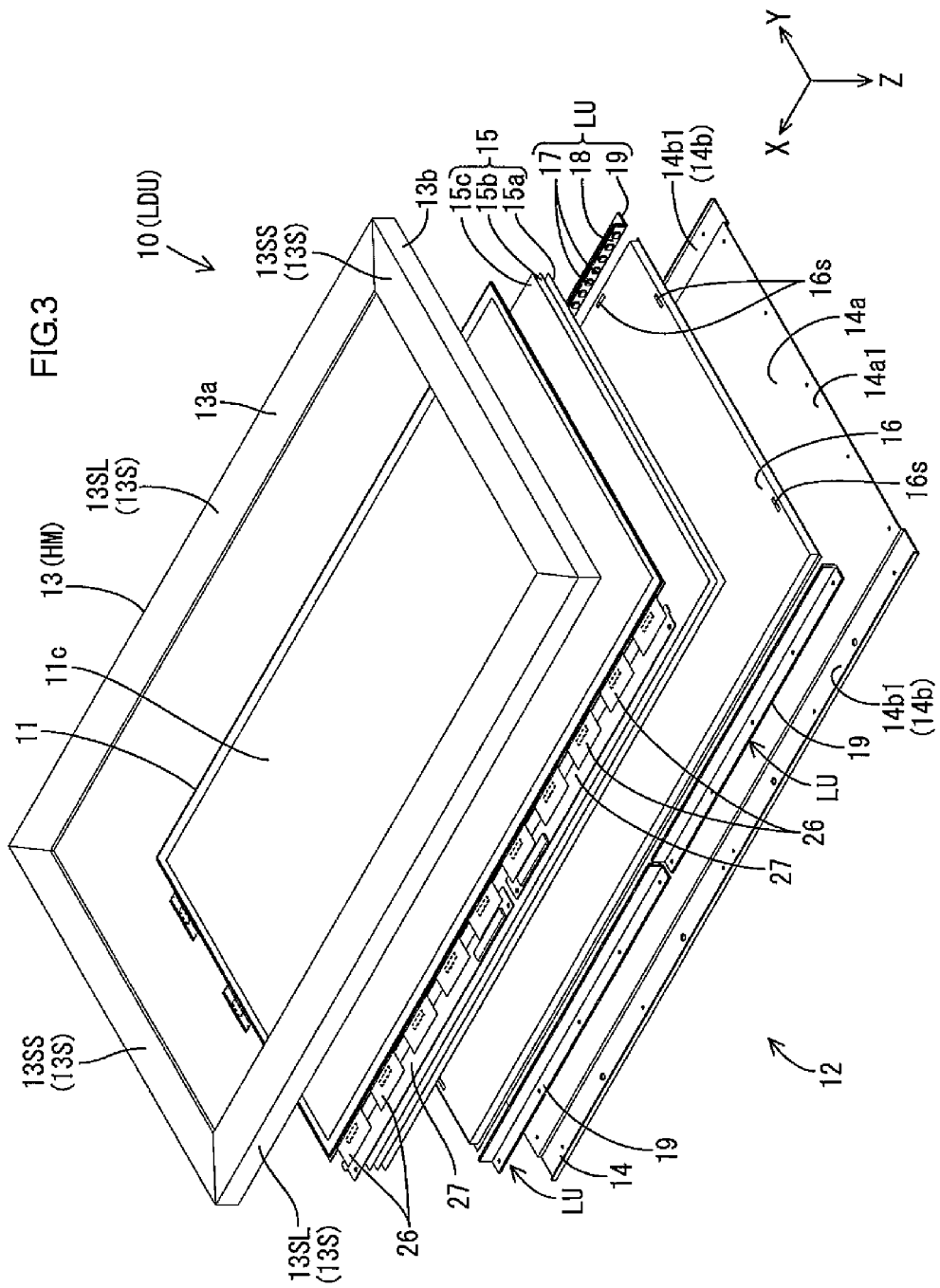
FIG. 3 is an exploded perspective view of the liquid crystal display device 10 illustrating a schematic configuration of the liquid crystal display unit LDU included therein.

As illustrated in FIG. 3, components of the liquid crystal display unit LDU included in the liquid crystal display device 10 are arranged in a space provided between the frame 13 that provides a front external configuration and the chassis 14 that provides a rear external configuration. The components arranged between the frame 13 and the chassis 14 at least include the liquid crystal panel 11, an optical member 15, a light guide plate 16, and LED units 20. The liquid crystal panel 11, the optical member 15, and the light guide plate 16 are placed on top of one another and held between the frame 13 on the front side and the chassis 14 on the rear side. The backlight device 12 includes the optical member 15, the light guide plate 16, the LED units LU, and the chassis 14. Namely, the liquid crystal display unit LDU without the liquid crystal panel 11 and the frame 13 corresponds to the backlight device 12. The LED units LU included in the backlight device 12 are arranged in the space between the frame 13 and the chassis 14. Two LED units LU are each arranged on each end of a short dimension of the light guide plate 16 (in the Y-axis direction). Each LED unit LU includes the LEDs 17 as light sources, the LED board 18, and a heat dissipation member (a heat spreader) 19. The LEDs 17 are mounted on the LED board 18. The LED board 18 is attached to the heat dissipation member 19. Each component will be described next.

As illustrated in FIG. 3, the liquid crystal panel has a landscape rectangular shape (rectangular and longitudinal) in a plan view and includes a pair of glass substrates 11a and 11b (see FIG. 4) and liquid crystals. The substrates 11a and 11b having high light transmissivity are bonded together with a predetermined gap therebetween. The liquid crystals are sealed between the substrates 11a and 11b. On one of the substrates (an array substrate 11b), switching elements (e.g. TFTs), pixel electrodes, and an alignment film are arranged. The switching elements are connected to gate lines and source lines that are arranged perpendicular to each other. The pixel electrodes are connected to the switching elements. On the other one of the substrates (a CF substrate 11a), color filters, a counter electrode, and an alignment film are arranged. The color filters include red (R), green (G), and blue (B) color portions that are arranged in a predetermined arrangement. The liquid crystal panel 11 is placed on a front side of the optical member 15, which will be described later. A rear-side surface of the liquid crystal panel 11 (an outer-side surface of a polarizing plate on the rear side) is fitted to the optical member 15 with minimal gaps therebetween. Therefore, dust is less likely to enter between the liquid crystal panel 11 and the optical member 15. The liquid crystal panel 11 includes a display surface 11c. The display surface 11c includes a display area and a non-display area. The display area is an inner area of a screen in which images are displayed. The non-display area is an outer area of the screen around the display area with a frame-like shape. The liquid crystal panel 11 is connected to the control board CTB via a driver for driving the liquid crystals and flexible boards 26. The liquid crystal panel 11 displays images in the display area of the display surface 11c based on signals sent from the control board CTB. The polarizing plates, which are not illustrated, are arranged on outer sides of the substrates 11a and 11b.

As illustrated in FIG. 3, similar to the liquid crystal panel 11, the optical member 15 has a landscape rectangular shape in a plan view and has substantially the same size (i.e., a short-side dimension and a long-side dimension) as the liquid crystal panel 11. The optical member 15 is placed on the front side of the light guide plate 16 (a light exit side), which will be described later, and sandwiched between the light guide plate 16 and the liquid crystal panel 11. The optical member 15 includes three sheets that are placed on top of one another. Specifically, a diffuser sheet 15a, a lens sheet (a prism sheet) 15b, and a reflecting type polarizing sheet 15c are placed on top of one another in this sequence from the rear side (the light guide plate 16 side). The three sheets 15a, 15b, and 15c of this embodiment have the substantially same size in a plan view. A sum of thicknesses of the three optical sheets that are placed on one another (a dimension in the Z-axis direction) is 1 mm.

Figure 4:
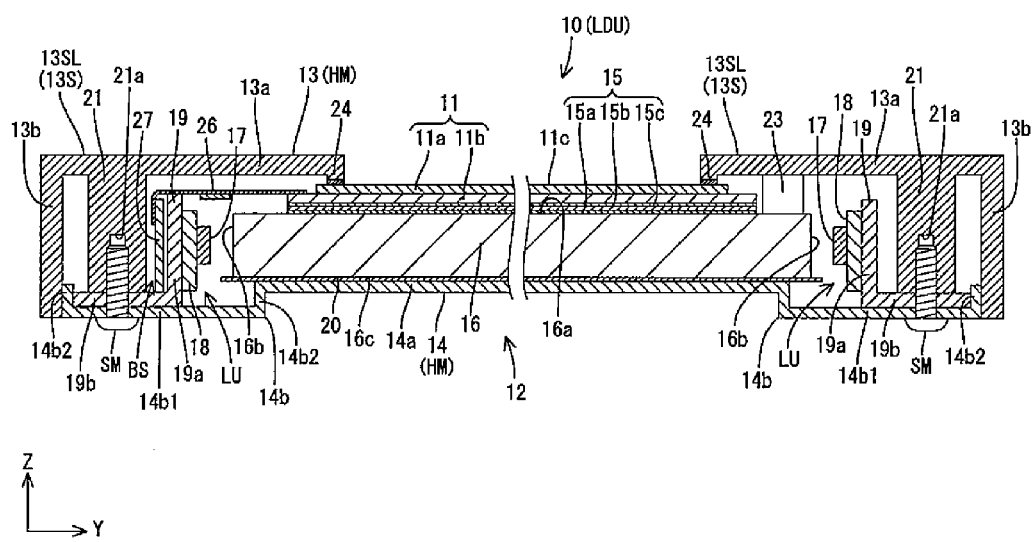
FIG. 4 is a cross-sectional view of the liquid crystal display device 10 along a short-side direction thereof illustrating a cross-sectional configuration.

The light guide plate 16 is made of substantially transparent (high light transmissivity) synthetic resin (e.g. acrylic resin or polycarbonate such as PMMA) which has a refractive index sufficiently higher than that of the air. As illustrated in FIG. 3, the light guide plate 16 has a landscape rectangular shape in a plan view similar to the liquid crystal panel 11 and the optical member 15. A thickness of the light guide plate 16 is larger than a thickness of the optical member 15. A long-side direction and a short-side direction of a main surface of the light guide plate 16 correspond to the X-axis direction and the Y-axis direction, respectively. A thickness direction of the light guide plate 16 that is perpendicular to the main surface of the light guide plate 16 corresponds to the Z-axis direction. The light guide plate 16 is arranged on the rear side of the optical member 15 and sandwiched between the optical member 15 and the chassis 14. As illustrated in FIG. 4, at least a short-side dimension of the light guide plate 16 is larger than those of the liquid crystal panel 11 and the optical member 15. The light guide plate 16 is arranged such that ends of the short dimension thereof (i.e., ends along a long-side direction of the light guide plate 16) protrude over ends of the liquid crystal panel 11 and the optical member 15 (so as not to overlap in a plan view). The LED units LU are arranged on sides of the short dimension of the light guide plate 16 so as to have the light guide plate 16 between the LED units LU in the Y-axis direction. Light from the LEDs 17 enters the light guide plate 16 through the ends of the short dimension of the light guide plate 16. The light guide plate 16 is configured to guide the light, which is from the LEDs 17 and enters the light guide plate 16 through the ends of the short dimension, toward the optical member 15 (on the front side). The thickness of the light guide plate 16 of this embodiment (a dimension in the Z-axis direction) is 3 mm.

One of the main surfaces of the light guide plate 16 facing the front side (a surface opposite the optical member 15) is a light exit surface 16*a*. Light exits the light guide plate 16 through the light exit surface 16*a* toward the optical member 15 and the liquid crystal panel 11. The light guide plate 16 includes peripheral end surfaces that are adjacent to the main surfaces of the light guide plate 16, and long-side end surfaces (end surfaces of the short dimension) which have elongated shapes along the X-axis direction are opposite the LEDs 17 (the LED boards 18). A predetermined space is provided between each long-side end and the LEDs 17 (the LED boards 18). The long-side end surfaces are light entrance surfaces 16*b* through each of which light from LEDs 17 enters. As illustrated in FIG. 4, a reflection sheet 20 is arranged on the rear side of the light guide plate 16, that is, on an opposed surface 16*c* that is opposite from the light exit surface 16*a* (a surface opposite the chassis 14). The reflection sheet 20 is arranged to cover an entire area of the opposed surface 16*c*. The light guide plate 16 includes through holes 16*s* in two short-side surfaces 16*d*, 16*d* and one of long-side surfaces 16*b* thereof (i.e., an upper peripheral surface of the light guide plate 16 when the liquid crystal display device 10 is in a standing position (see FIG. 2)). The through holes 16*s* are located so as to correspond to positions of step portions, which will be described later, in a short-side direction (the Y-axis direction). The through holes 16*s* extend through the light guide plate 16 in the thickness direction (Z-axis direction) from one plate surface to the other plate surface. Openings of the through holes 16*s* have a rectangular shape in a plan view.

The reflection sheet 20 is arranged so as to be sandwiched between the chassis 14 and the light guide plate 16. Light that exits the light guide plate 16 through the opposed surface 16*c* toward the rear side is reflected by the reflection sheet 20 toward the front side. The reflection sheet 20 is made of synthetic resin and has a white surface having high light reflectivity. A short-side dimension of the reflection sheet 20 is larger than that of the light guide plate 16. The reflection sheet 20 is arranged such that ends of the short dimension thereof protrude closer to the LEDs 17 compared to the light entrance surfaces 16*b* of the light guide plate 16. Light that travels at an angle from the LEDs 17 toward the chassis 14 is effectively reflected toward the light entrance surfaces 16*b* of the light guide plate 16 by the protruded portions of the reflection sheet 20.

Next, a configuration of each of the LEDs 17, the LED board 18, and the heat dissipation member 19 included in the LED unit LU will be described. Each LED 17, which is included in the LED unit LU, includes an LED chip (not illustrated). The LED chip is arranged on a board that is fixed on a surface of the LED board 18 facing the light guide plate 16 and sealed with resin. The LED chip mounted on the board has one main light emission wavelength. Specifically, the LED chip that emits light in a single color of blue is used. The resin that seals the LED chip contains phosphors dispersed therein. The phosphors emit light in a predetermined color when excited by blue light emitted from the LED chip. Thus, overall color of light emitted from the LED 17 is white. The phosphors may be selected, as appropriate, from yellow phosphors that emit yellow light, green phosphors that emit green light, and red phosphors that emit red light. The phosphors may be used in combination of the above phosphors. The LED 17 includes a main light-emitting surface that is opposite from a surface thereof mounted on the LED board 18 (an opposed surface opposite the light entrance surfaces 16*b* of the light guide plate 16). Namely, the LED 17 is a so-called top-surface-emitting type LED.

As illustrated in FIG. 3, each LED board 18 included in the LED unit LU has an elongated plate-like shape and extends in the long-side direction of the light guide plate 16 (the X-axis direction, the long-side direction of the light entrance surface 16*b*). The LED boards 18 are arranged in a space between the frame 13 and the chassis 14 such that a plate surface of each LED board 18 is parallel to the X-Z plane, that is, parallel to the light entrance surface 16*b* of the light guide plate 16. Each LED board 18 has a long-side dimension that is about a half of the long-side dimension of the light guide plate 16. The LED board 18 includes a mount surface on which the LEDs 17 are surface-mounted. The mount surface is a plate surface that faces inward, namely, a plate surface that faces the light guide plate 16 (the surface opposite the light guide plate 16). The LEDs 17 are arranged in a line (i.e., linearly) at intervals on the mount surface of the LED board 18 along the long-side direction of the LED board 18 (the X-axis direction). In other words, multiple LEDs 17 are arranged apart from each other along long-side ends of the backlight device 12. Distances between the adjacent LEDs 17 in the X-axis direction are substantially equal, that is, the LEDs 17 are arranged at substantially equal intervals. An arrangement direction of the LEDs 17 corresponds to the longitudinal direction of the LED board 18 (the X-axis direction). A metal-film trace (not illustrated), such as a copper-foil trace, is formed on the mount surface of the LED board 18. The metal-film trace extends in the X-axis direction and crosses over a group of the LEDs 17 so as to connect the adjacent LEDs 17 in series. Terminals at ends of the trace are electrically connected to the power source board PWB via wiring members including connecters and electric wires. Thus, driving power is supplied to the LEDs 17.

The heat dissipation member 19 included in each LED unit LU is made of metal having high thermal conductivity, such as aluminum. As illustrated in FIGS. 3 and 4, the heat dissipation member 19 includes an LED mounting portion 19*a* and a heat dissipating portion 19*b*. The LED board 18 is attached to the LED mounting portion 19*a*. The heat dissipating portion 19*b* is in surface-contact with a plate surface of the chassis 14. The LED mounting portion 19*a* and the heat dissipating portion 19*b* form an angle therebetween so as to have an L-like shape in a cross-section. The heat dissipation member 19 has a long dimension substantially equal to the long dimension of the LED board 18. The LED mounting portion 19*a* of the heat dissipation member 19 has a plate-like shape parallel to the plate surface of the LED board 18 and the light entrance surface 16*b* of the light guide plate 16. A long-side direction, a short-side direction, and a thickness direction of the LED mounting portion 19*a* are aligned with the X-axis direction, the Z-axis direction, and the Y-axis direction, respectively. The LED board 18 is mounted on an inner surface of the LED mounting portion 19*a*, which is a plate surface that faces the light guide plate 16. While the LED mounting portion 19*a* has a long dimension that is substantially equal to the long dimension of the LED board 18, a short dimension of the LED mounting portion 19*a* is larger than a short dimension of the LED board 18. Therefore, ends of the LED mounting portion 19*a* with respect to the short dimension protrude over the LED board 18 in the Z-axis direction. An outer plate surface of the LED mounting portion 19*a* is a plate surface opposite from the plate surface on which the LED board 18 is attached. The outer plate surface faces a screw mounting portion 21 of the frame 13. The LED mounting portion 19a is located between the screw mounting portion 21 of the frame 13 and the light guide plate 16. The LED mounting portion 19a projects from an inner end of the heat dissipating portion 19b, which is an end of the heat dissipating portion 19b closer to the LEDs 17 (the light guide plate 16), in the Z-axis direction (a direction in which the liquid crystal panel 11, optical member 15, and the light guide plate 16 overlap each other) toward the front side, that is, toward the frame 13.

As illustrated in FIGS. 3 and 4, the heat dissipating portion 19b has a plate-like shape and is parallel to the plate surface of the chassis 14. A long-side direction, a short-side direction, and a thickness direction of the heat dissipating portion 19b are aligned with the X-axis direction, the Y-axis direction, and the Z-axis direction, respectively. The heat dissipating portion 19b extends from a rear-side end of the LED mounting portion 19a in the Y-axis direction toward the outer side. In other words, the heat dissipating portion 19b extends from an end of the LED mounting portion 19a closer to the chassis 14 in an opposite direction to the light guide plate 16. The heat dissipating portion 19b has a long dimension substantially equal to the long-side dimension of the LED mounting portion 19a. An entire rear plate surface of the heat dissipating portion 19b, which is a plate surface of the heat dissipating portion 19b facing the chassis 14, is in surface-contact with the plate surface of the chassis 14. A front plate surface of the heat dissipating portion 19b is a plate surface opposite from the surface in contact with the chassis 14. The front plate surface faces the screw mounting portion 21 of the frame 13. Specifically, the front plate surface of the heat dissipating portion 19b is in contact with a projected end surface of the screw mounting portion 21. The heat dissipating portion 19b is sandwiched (or disposed) between the screw mounting portion 21 of the frame 13 and the chassis 14. With this configuration, heat generated from the LEDs 17 as they are turned on is transferred to the chassis 14 and the frame 13 including the screw mounting portion 21 via the LED board 18, the LED mounting portion 19a, and the heat dissipating portion 19b. Therefore, heat is effectively released to the outside of the liquid crystal display device 10 and thus the heat is less likely to stay therein. The heat dissipating portion 19b includes through holes. The screw members SM are passed through the respective through holes. The heat dissipating portion 19b is fixed to the screw mounting portion 21 with the screw members SM.

Next, configurations of the frame 13 and the chassis 14 that form the exteriors and a holding member HM will be described. The frame 13 and the chassis 14 are made of metal such as aluminum. Therefore, the mechanical strength (rigidity) and thermal conductivity of the frame 13 and the chassis 14 are higher than those of a frame and a chassis made of synthetic resin. As illustrated in FIG. 3, the frame 13 and the chassis 14 hold the LED units LU at ends of the short dimension of the frame 13 and the chassis 14 (at the respective long sides). The frame 13 and the chassis 14 hold the liquid crystal panel 11, the optical member 15, and the light guide plate 16, which are placed on top of one another from the front side and the rear side.

As illustrated in FIG. 3, the frame 13 has a landscape rectangular shape so as to surround the display area in the display surface 11c of the liquid crystal panel 11. The frame 13 includes a panel holddown portion 13a and a peripheral wall 13b. The panel holddown portion 13a is parallel to the display surface 11c of the liquid crystal panel 11 and presses the liquid crystal panel 11 from the front side. The peripheral wall 13b protrudes from outer peripheral edges of the panel holddown portion 13a toward the rear side. The panel holddown portion 13a and the peripheral wall 13b form an L-like shape in a cross section. The panel holddown portion 13a forms a landscape-rectangular frame-like shape that corresponds to an outer peripheral portion of the liquid crystal panel 11 (i.e., the non-display area, a frame-like portion). The panel holddown portion 13a presses a substantially entire area of the outer peripheral portion of the liquid crystal panel 11 from the front side. The panel holddown portion 13a has a width that is large enough to cover not only the outer peripheral portion of the liquid crystal panel 11 but also an outer peripheral portion of the optical member 15, an outer peripheral portion of the light guide plate 16, and LED units LU from the front side. The outer peripheral portions of the optical member 15 and the light guide plate 16 and the LED units LU are located outer than the outer peripheral portion of the liquid crystal panel 11 in a radiation direction. Similar to the display surface 11c of the liquid crystal panel 11, a front exterior surface of the panel holddown portion 13a (an opposed surface from the surface facing the liquid crystal panel 11) is viewed from the front side of the liquid crystal display device 10. The panel holddown portion 13a forms a front exterior of the liquid crystal display device 10 together with the display surface 11c of the liquid crystal panel 11. The peripheral wall 13b has a substantially rectangular hollow shape and protrudes from the outer peripheral portion (specifically, an outer peripheral end portion) of the panel holddown portion 13a toward the rear side. The peripheral wall 13b entirely surrounds the liquid crystal panel 11, the optical member 15, the light guide plate 16, and the LED units LU, which are arranged in the space between the frame 13 and the chassis 14. The peripheral wall 13b surrounds an entire periphery of the rear chassis 14 on the rear side. An outer surface of the peripheral wall 13b that extends along an outer peripheral surface of the liquid crystal display device 10 can be viewed from the outside of the liquid crystal display device 10. Therefore, the outer surface of the peripheral wall 13b constitutes a top surface, a bottom surface, and peripheral surfaces of the liquid crystal display device 10.

The frame 13 having the above-described basic configuration is assembled from four divided frame members 13S corresponding to four sides (long sides and short sides). Specifically, the divided frame members 13S include a pair of long-side frame members 13SL and a pair of short-side frame members 13SS. The long-side frame members 13SL correspond to the long sides of the frame 13 (including panel holddown portions 13a and peripheral wall portions 13b). The short-side frame members 13SS correspond to the short sides of the frame 13. Positioning ribs 23, which will be described later, are included in the respective short-side frame members 13SS. Each long-side frame member 13SL covers the LED units LU in addition to the liquid crystal panel 11, the optical member 15, and the light guide plate 16 (see FIG. 4). Therefore, the long-side frame member 13SL has a width larger than that of each short-side frame member 13SS that is not cover the LED units LU (see FIG. 5 or 6).

Figure 5:
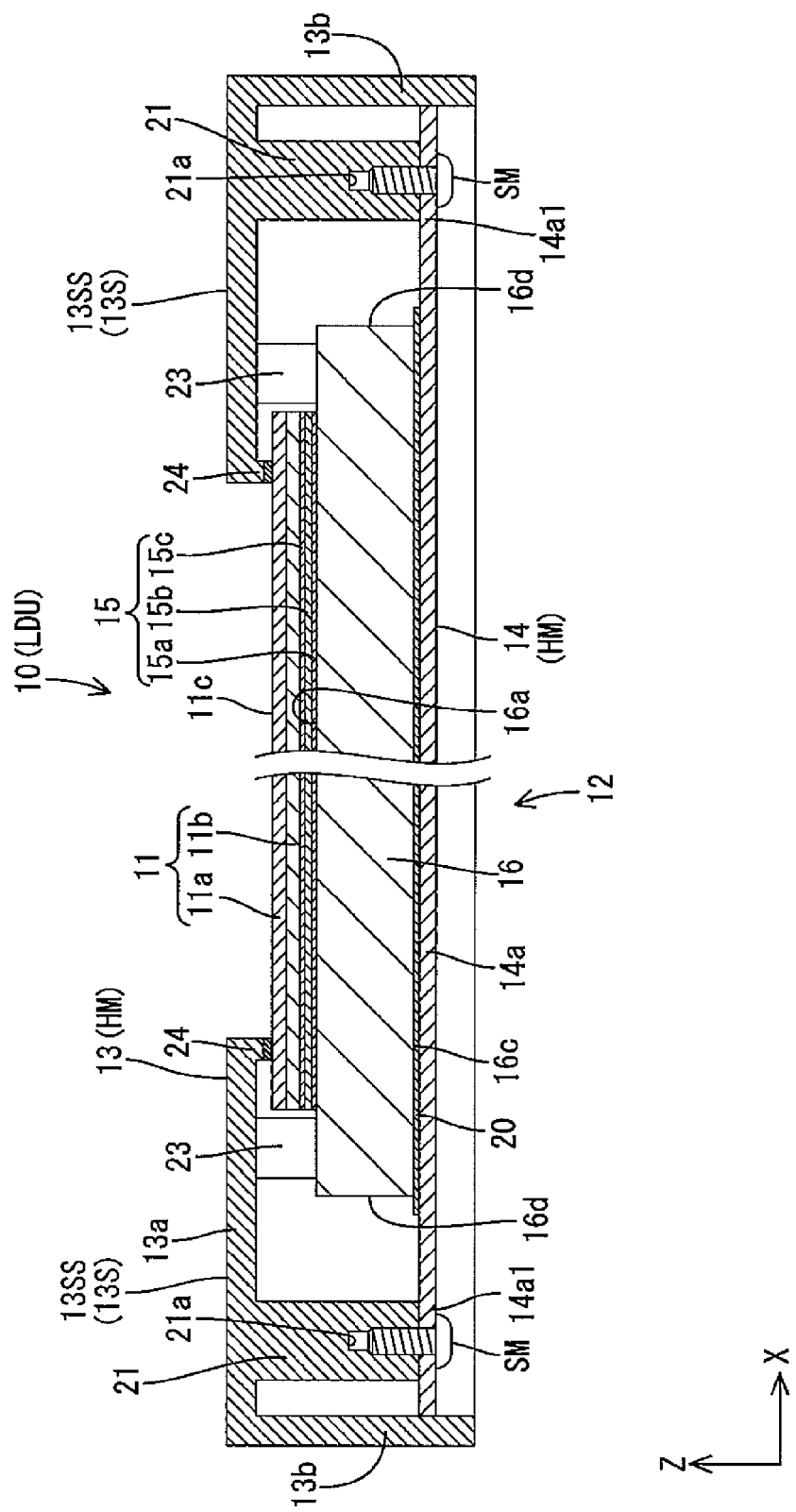
FIG. 5 is a cross-sectional view of the liquid crystal display device 10 along a long-side direction thereof illustrating a cross-sectional configuration.
Figure 6:
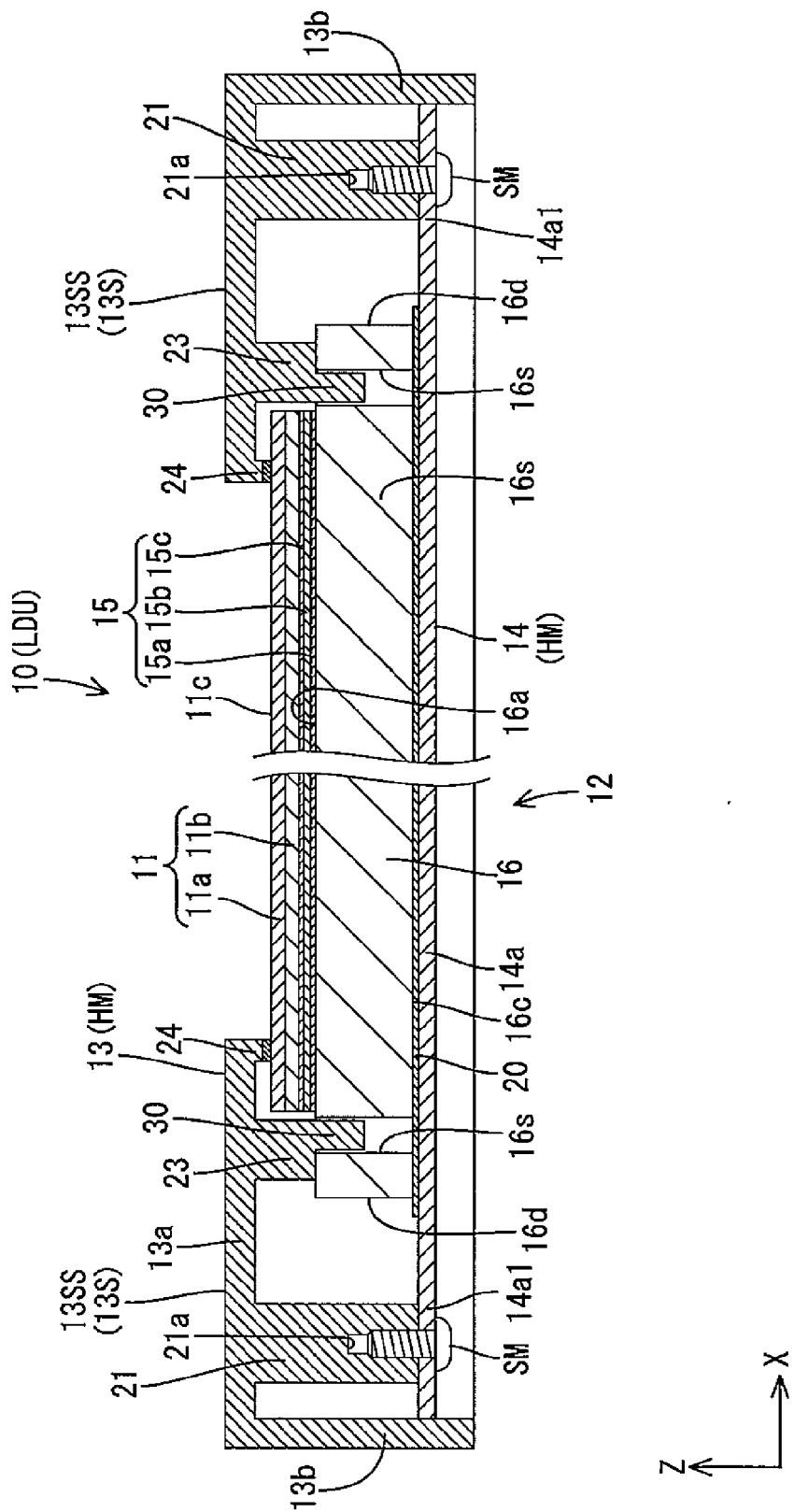
FIG. 6 is a cross-sectional view of the liquid crystal display device 10 along a long-side direction thereof with a section including a positioning rib 23 illustrating a cross-sectional configuration.

As illustrated in FIGS. 4 through 6, the panel holddown portion 13a includes screw mounting portions 21. Each of the screw mounting portions 21 is located closer to an interior side than the peripheral wall 13b of the panel holddown portion 13a (a position close to the light guide plate 16). Screw members SM (an example of an attachment member) are attached to the screw mounting portions 21. The screw mounting portion 21 protrudes from an inner surface of the panel holddown portion 13a in the Z-axis direction toward the rear side and has an elongated block-like shape that extends along each side of the panel holddown portion 13a (in the X-axis direction or the Y-axis direction). As illustrated in FIG. 4, the screw mounting portion 21 includes a groove 21a that opens to the rear side and to which the screw member SM is fastened. As illustrated in FIG. 4, a predetermined gap is provided between each screw mounting portion 21 on a long side and a corresponding LED mounting portion 19a. One of the heat dissipation members 19 overlaps the flexible boards 26 in a plan view. A space is provided between the heat dissipation member 19 and the screw mounting portion 21 to which the heat dissipation member 19 is attached. Printed circuit boards 27 are arranged in the space. The flexible circuit boards 26 are arranged on the printed circuit board 27 at intervals along a long-side direction of the printed circuit board 27. The flexible boards 26 are connected to the printed circuit board 27 at the other end thereof. The printed circuit board 27 includes a connector (not illustrated) to which an end of an FPC (not illustrated) is connected. The other end of the FPC extends to the rear side of the chassis 14 through an FPC hole (not illustrated) in the chassis 14 and is connected to the control board CTB.

As illustrated in FIGS. 4 through 6, the panel holddown portion 13a includes screw mounting portions 21. Each of the screw mounting portions 21 is located closer to an interior side than the peripheral wall 13b of the panel holddown portion 13a (a position close to the light guide plate 16). Screw members SM (an example of an attachment member) are attached to the screw mounting portions 21. The screw mounting portion 21 protrudes from an inner surface of the panel holddown portion 13a in the Z-axis direction toward the rear side and has an elongated block-like shape that extends along each side of the panel holddown portion 13a (in the X-axis direction or the Y-axis direction). As illustrated in FIG. 4, the screw mounting portion 21 includes a groove 21a that opens to the rear side and to which the screw member SM is fastened. As illustrated in FIG. 4, a predetermined gap is provided between each screw mounting portion 21 on a long side and a corresponding LED mounting portion 19a. One of the heat dissipation members 19 overlaps the flexible boards 26 in a plan view. A space is provided between the heat dissipation member 19 and the screw mounting portion 21 to which the heat dissipation member 19 is attached. Printed circuit boards 27 are arranged in the space. The flexible circuit boards 26 are arranged on the printed circuit board 27 at intervals along a long-side direction of the printed circuit board 27. The flexible boards 26 are connected to the printed circuit board 27 at the other end thereof. The printed circuit board 27 includes a connector (not illustrated) to which an end of an FPC (not illustrated) is connected. The other end of the FPC extends to the rear side of the chassis 14 through an FPC hole (not illustrated) in the chassis 14 and is connected to the control board CTB.

As illustrated in FIG. 3, the chassis 14 has a substantially longitudinal shallow tray shape as a whole and covers entire areas of the light guide plate 16 and the LED unit LU from the rear side. A rear outer surface of the chassis 14 (a surface of the chassis 14 opposite from a surface that faces the LED unit LU) is viewed from the rear side and forms a back surface of the liquid crystal display device 10. The chassis 14 includes a bottom-plate portion 14a and a pair of LED holding portions 14b. The bottom-plate portion 14a has a landscape rectangular shape similar to the light guide plate 16. Each of the LED holding portions 14b protrudes from a long-side edge of the bottom-plate portion 14a toward the rear side to form a step. The LED units LU are arranged in the respective LED holding portions 14b.

As illustrated in FIGS. 3 and 4, the bottom-plate portion 14a has a flat plate shape to receive a portion of the light guide plate 16 in its middle portion with respect to the short-side direction from the rear side (except the end portions with respect to the short-side direction). The bottom-plate portion 14a is configured as a light guide plate receiving portion. As illustrated in FIGS. 5 and 6, ends of the long dimension of the bottom-plate portion 14a extend over the ends of the long dimension of the light guide plate 16. The ends of the bottom-plate portion 14a are screw mounting portions 14a1 to which the screw members SM are mounted from the outside such that the frame 13 and the chassis 14 are fixed with the screw members SM.

As illustrated in FIGS. 3 and 4, the LED holding portions 14b are arranged so as to sandwich the bottom-plate portion 14a from ends of the short dimension of the bottom-plate portion 14a. Each LED holding portion 14b is recessed from the bottom plate portion 14a toward the rear side to provide a space in which the LED unit LU is arranged. The LED holding portion 14b includes a screw mounting portion 14b1 and a pair of side-plate portions 14b2. The screw mounting portion 14b1 is parallel to the bottom-plate portion 14a and the screw members SM are attached thereto from the outside. The side-plate portions 14b2 project from ends of the screw mounting portion 14b1 toward the front side. One of the side-plate portions 14b2 on the inner side continues to the bottom-plate portion 14a. An inner surface of the screw mounting portion 14b1 of the LED holding portion 14b is in surface-contact with a bottom-plate portion 19b of the heat dissipation member 19 of the LED unit LU. The other one of the side-plate portions 14b2 of the LED holding portion 14b on the outer side is fitted in a space provided between the long-side screw mounting portion 21 and the peripheral wall 13b. The side-plate portion 14b2 on the outer side has a positioning function with which the chassis 14 is properly positioned with respect to the frame 13 in the Y-axis direction.

Figure 7:
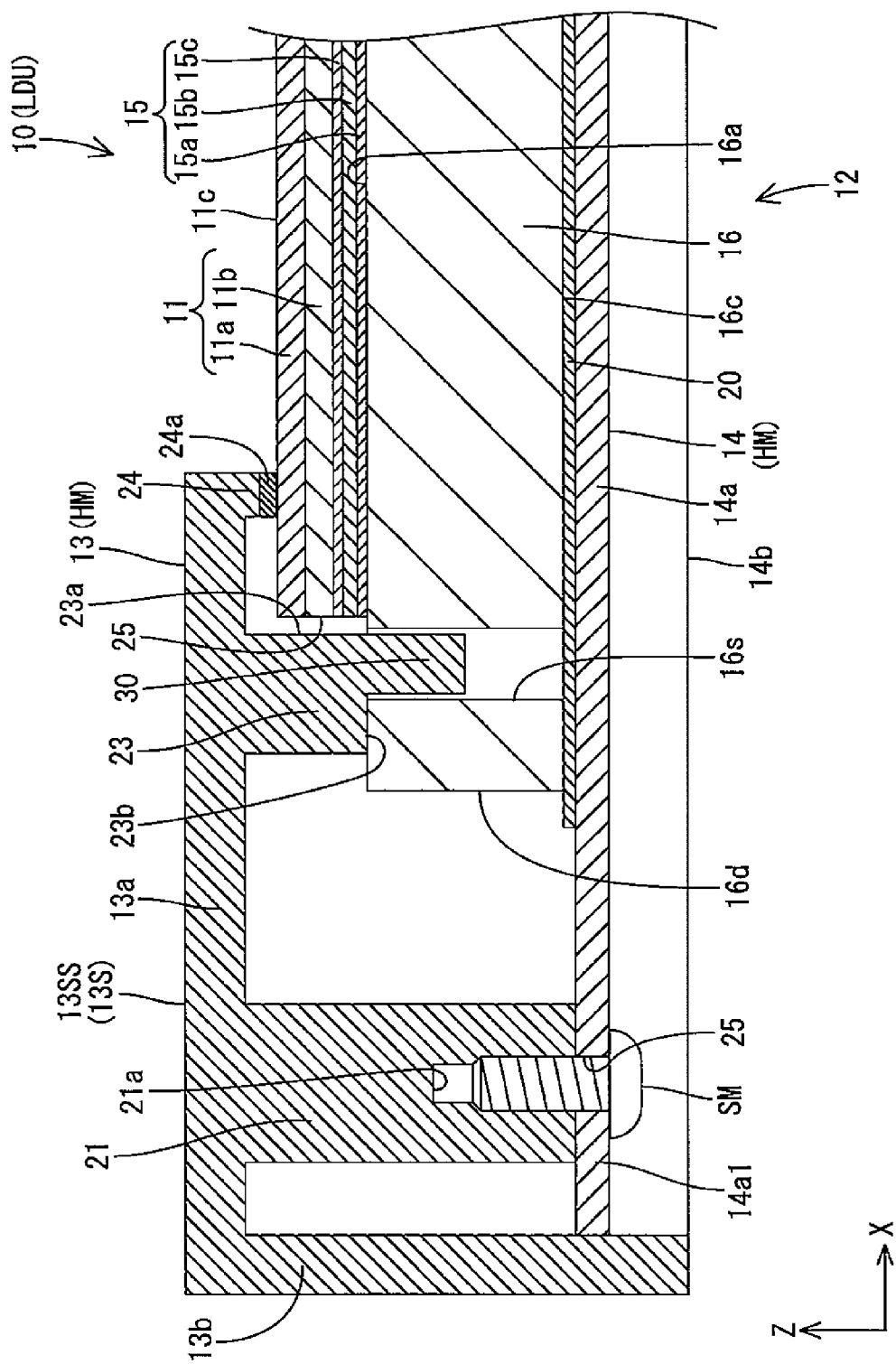
FIG. 7 is a magnified cross-sectional view of a relevant portion of the liquid crystal display device 10 in FIG. 6 illustrating a step portion 30 and therearound.
Figure 8:
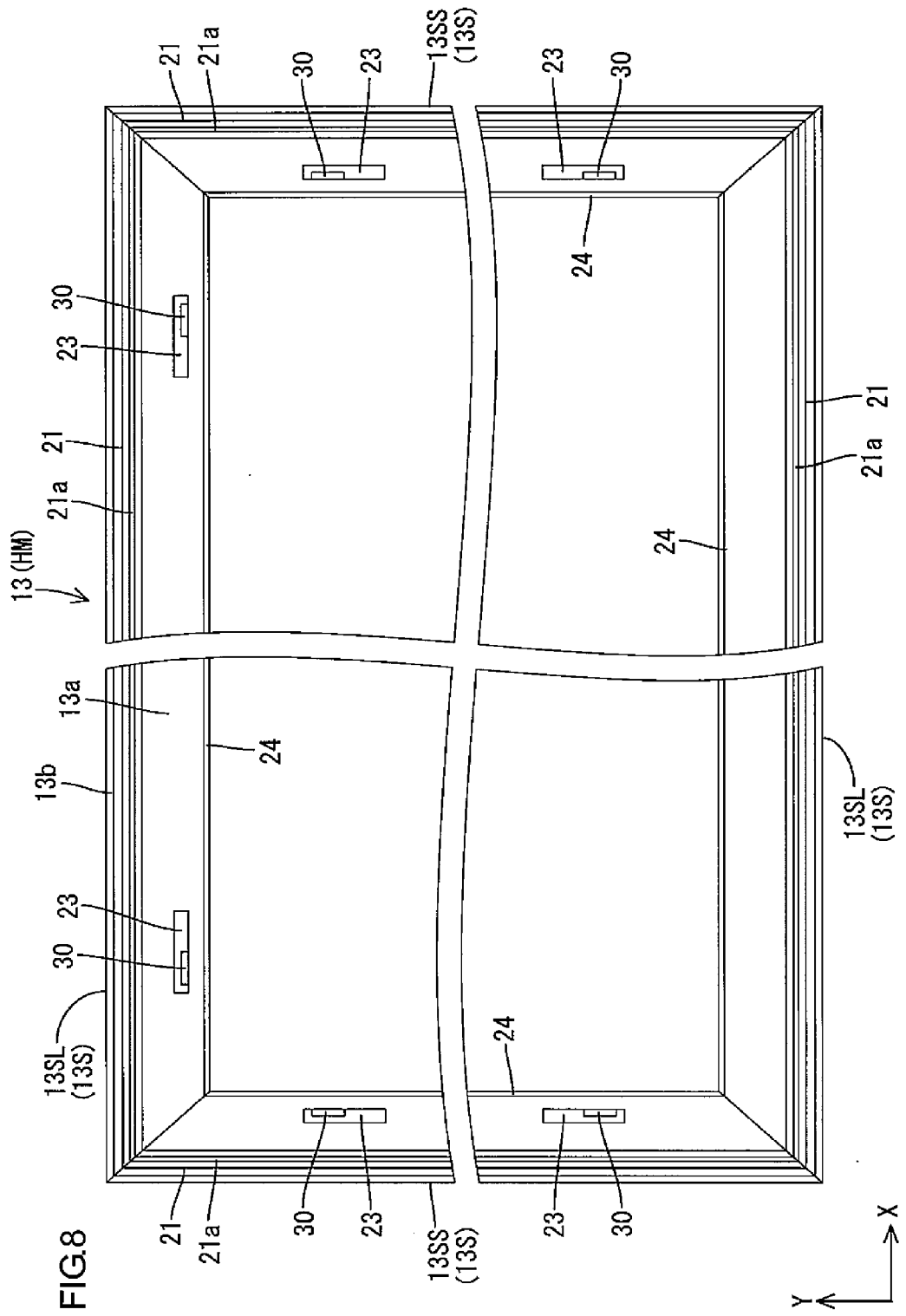
FIG. 8 is a plan view of a frame 13 viewed from the rear.
Figure 9:
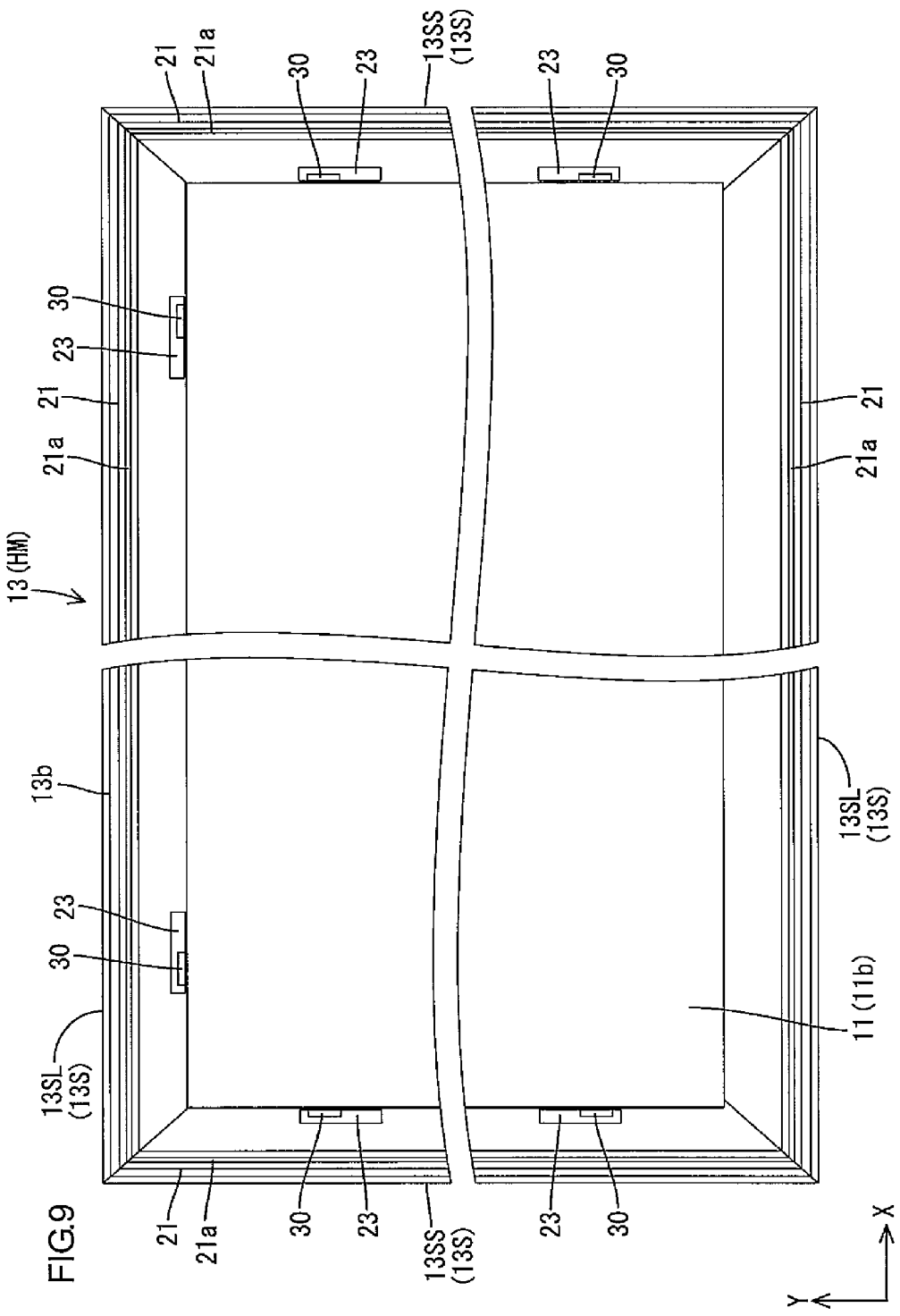
FIG. 9 is a plan view of the frame 13 with a liquid crystal panel 11 placed thereon viewed from the rear.
Figure 10:
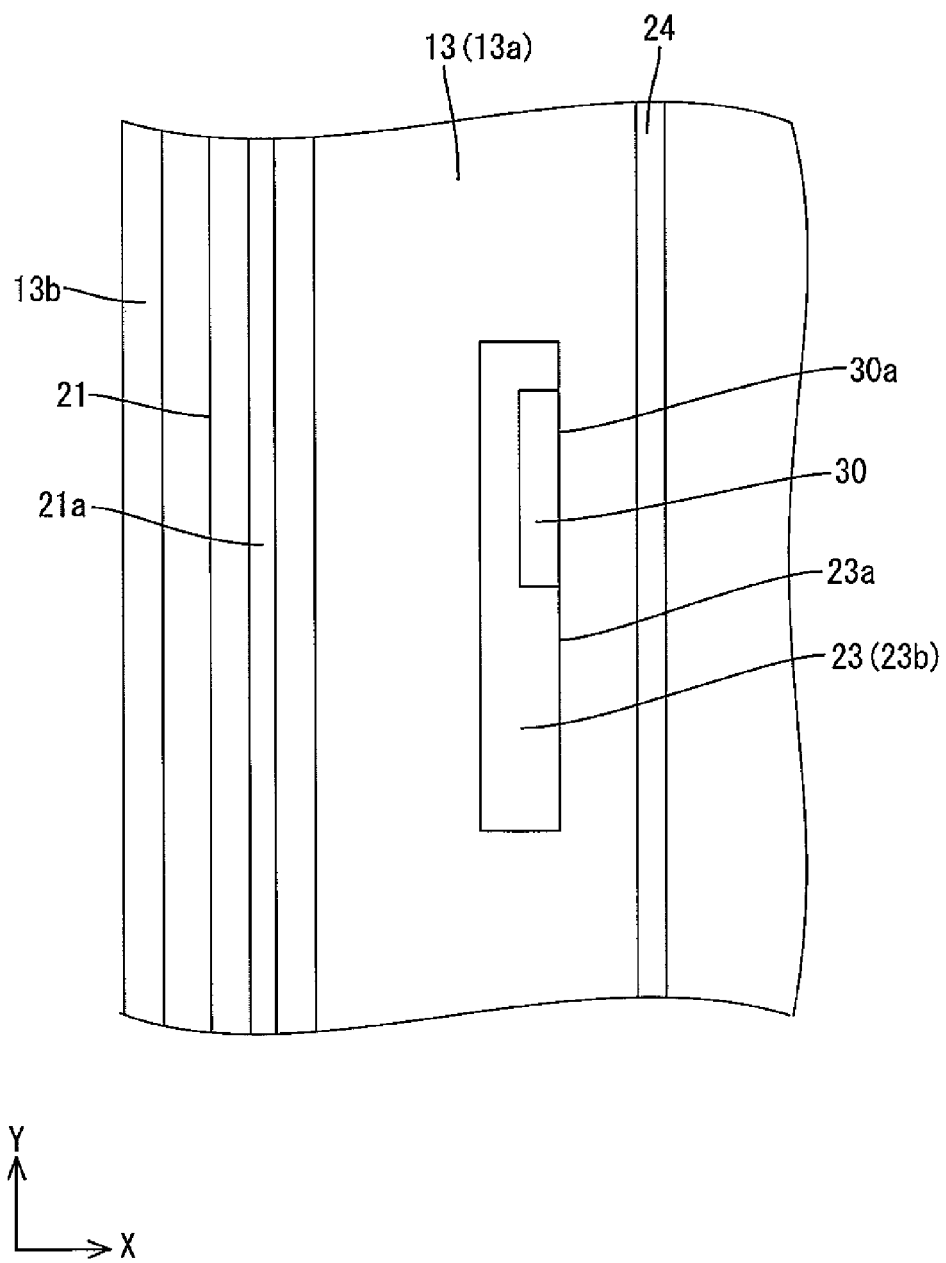
FIG. 10 is a magnified plan view of a portion in FIG. 8 illustrating the positioning rib 23 and therearound.

Next, configurations of positioning ribs 23 included in the frame 13, configurations of step portions 30 included in the respective positioning ribs 23, and a positioning manner of the liquid crystal panel 11 in the production process will be described. As illustrated in FIG. 8, the frame 13 includes six positioning ribs (an example of a positioning portion) 23 integrally formed with the panel holddown portions 13a. The panel holddown portions 13a include those of the short-side frame members 13SS and that of one of the long-side frame members 13SL (the long-side frame member 13SL on the upper side when the liquid crystal display device 10 is in the standing position (see FIG. 2)). The positioning ribs 23 are located inward with respect to the respective screw mounting portions 21. The positioning ribs 23 support the light guide plate 16 from the front (the display surface 11c side). The positioning ribs 23 are used for positioning the liquid crystal panel 11 during the production of the liquid crystal display device 10. Each divided frame member 13S includes two positioning ribs 23. The positioning rib 23 projects from an inner surface of the corresponding panel holddown portion 13a in the Z-axis direction (a direction in which the screw mounting portion 21 projects) toward the rear (toward the chassis 14). The positioning rib 23 has an elongated block-like shape (a square block-like shape) which extends along the corresponding side of the panel holddown portion 13a. As illustrated in FIGS. 7 to 9, the positioning rib 23 has an inner surface that is parallel and opposite to a peripheral surface of the liquid crystal panel 11 and a peripheral surface of the optical member 15 (portions of the peripheral surfaces of the liquid crystal panel 11 and the optical member 15 opposite the corresponding positioning ribs 23 are referred to as an opposed portion 25). The inner surface 23a of the positioning rib 23 is located adjacent to the peripheral surface of the liquid crystal panel 11 and the optical member 15. Each positioning rib 23 has a projection dimension equal to a sum of thicknesses of the liquid crystal panel 11 and the optical member 15. Therefore, distal end surfaces 23b of the positioning ribs 23 are in contact with the light exit surface 16a of the light guide plate 16 while the light guide plate 16 is sandwiched between the distal end surfaces 23b and the chassis 14. The light guide plate 16 is supported by the distal end surfaces 23b of the positioning ribs 23 from the front (from the display surface 11c side), that is, the positioning ribs 23 have functions for supporting the light guide plate 16. Portions of the light guide plate 16 closer to edges thereof are held down from the front by the distal end surfaces 23b of the positioning ribs 23.

Figure 11:
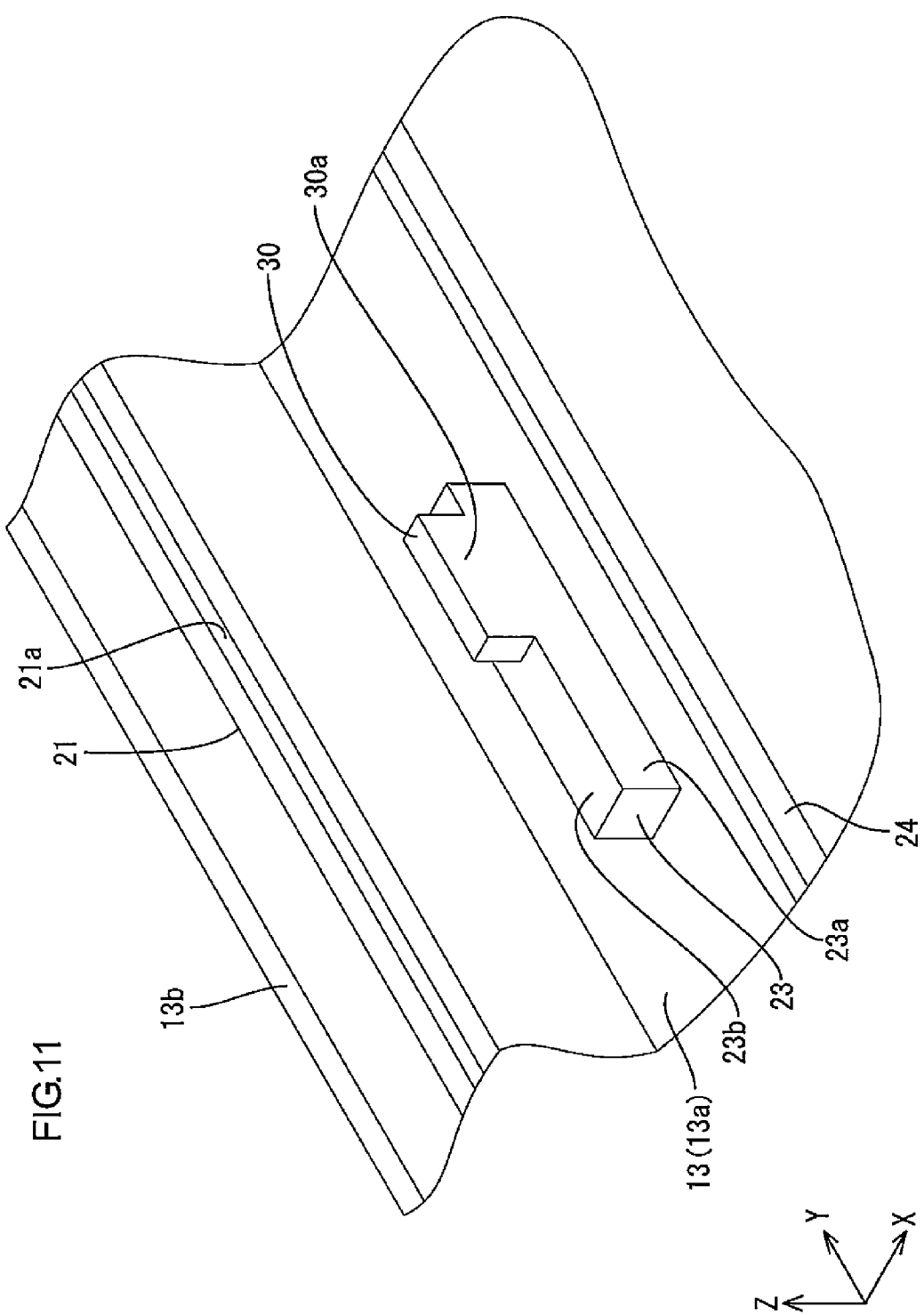
FIG. 11 is a perspective view illustrating the positioning rib 23 and therearound in FIG. 10 viewed from an angle.

The positioning rib 23 includes the step portion 30 that projects from a portion of the distal end surface 23b of the positioning rib 23 toward the rear (the chassis side) so as to form a step-like shape. The positioning rib 23 includes one step portion 30. Similar to the positioning rib 23, the step portion 30 has a block-like shape (a rectangular column-like shape). As illustrated in FIG. 11, the step portion 30 includes an inner surface (i.e., a surface that faces the corresponding opposed portion 25) 30a that is on the same plane with the inner surface 23a of the positioning rib 23. Namely, similar to the inner surface 23a of the positioning rib 23, the inner surface 30a of the step portion 30 is opposite and parallel to the corresponding opposed portion 25. Peripheral surfaces of the step portion 30 other than the inner surface 30a form steps together with corresponding peripheral surfaces of the positioning portion 23. As described earlier, the step portions 30 are inserted in the respective through holes 16s of the light guide plate 16. Each step portion 30 is inserted in the corresponding through hole 16s with a slight gap between the step portion 30 and peripheral surfaces that define the through hole 16s. Namely, the step portion 30 is arranged in the through hole 16s. When the step portions 30 are arranged in the through holes 16s, the light guide plate 16 is positioned within the frame 13 in a plate surface direction thereof (an X-Y plane direction). Each step portion 30 has a projection dimension no less than the thickness of the optical member 15 (i.e., 1 mm) but no more than a thickness of the light guide plate 16 (i.e., 3 mm). With this configuration, distal ends of the step portions 30 are within the respective through holes 16s without sticking out of the through surface 16s.

In the production process of the liquid crystal display device 10, components of the liquid crystal display device 10 are attached to one another in sequence starting from the component on the front side of the liquid crystal display device 10 (the upper side in FIG. 4), specifically as follows. The frame 13 is flipped over. The liquid crystal panel 11 is placed on the rear surface of the frame 13 while the liquid crystal panel 11 is positioned such that the opposed portions 25 of the liquid crystal panel 11 come closer to the inner surfaces 30a of the respective positioning ribs 30 so as to be parallel to and opposed to the positioning ribs 30. The optical member 15 is positioned in the same manner as the liquid crystal panel 11 and placed on the rear surface of the liquid crystal panel 11. The light guide plate 16 is attached to the optical member 15 while the step portions 30 of the positioning ribs 23 are inserted in the respective through holes 16s of the light guide plate 16. The chassis 14 is attached. The screw members SM are screwed from the rear side of the chassis 14 so that the chassis 14 is fixed to the frame 13. The liquid crystal display device 10 is complete.

Figure 12:
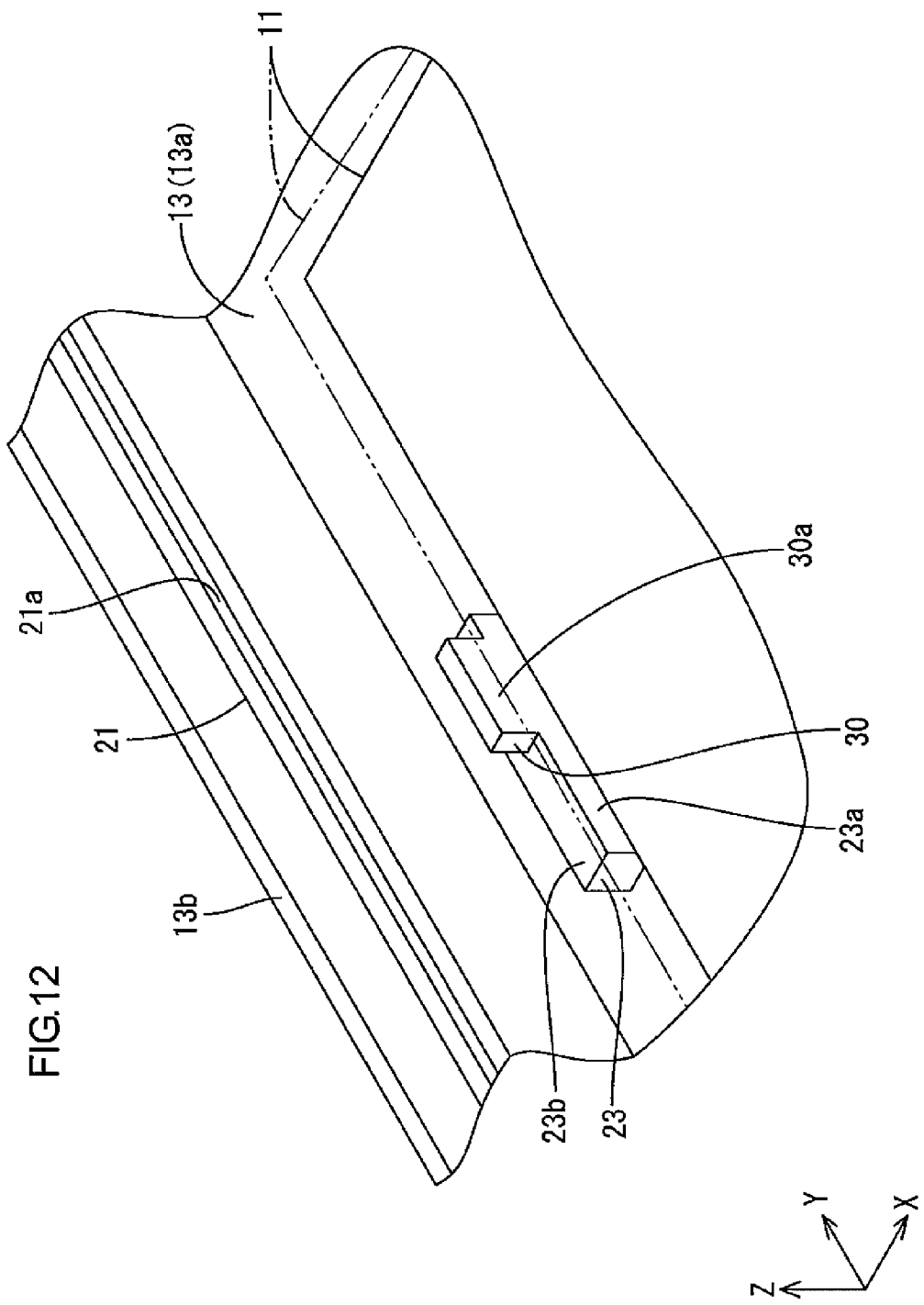
FIG. 12 illustrates a state of the liquid crystal panel 11 being positioned along the positioning rib 23 in a positioning step.

In the above-described production process of the liquid crystal display device 10, when the liquid crystal panel 11 is positioned with respect to the positioning ribs 23, a shift may occur in position of the liquid crystal panel 11. If it occurs, a portion of the peripheral surface of the liquid crystal panel 11 may be placed on one of the distal end surfaces 23b of the positioning ribs 23. In FIG. 12, a two-dot chain line illustrates a position of the liquid crystal panel 11 in a case that the peripheral surface of the liquid crystal panel 11 is moved to a position higher than the distal end surface 23b of the positioning rib 23. The peripheral surface of the liquid crystal panel 11 contacts the inner surface 30a of the step portion 30, as illustrated with the two-dot chain line in FIG. 12, before a portion of the peripheral surface of the liquid crystal panel 11 is pushed over the distal end surface 23b of one of the positioning ribs 23. Therefore, the position of the peripheral surface of the liquid crystal panel 11 is less likely to be further shifted outward. The inner surface 30a of the step portion 30 and the inner surface 23a of the positioning rib 23 are on the same plane. Namely, the inner surface 30a of the step portion 30 and the inner surface 23a of the positioning rib 23 do not form a step where the peripheral surface of the liquid crystal panel 11 may be placed. With the peripheral surfaces of the liquid crystal panel 11 against the inner surfaces 30a of the step portions 30, the peripheral surfaces of the liquid crystal panel 11 are less likely to be placed on the distal end surfaces 23b of the positioning ribs 23. Even if the shift in position occurs in the production process, attachment of components is not performed under the condition that the liquid crystal panel 11 is placed on the positioning ribs 23.

In the production process of the liquid crystal display device 10, a shift in position of the liquid crystal panel 11 may occur during positioning of the liquid crystal panel 11 relative to the positioning ribs 23. Even if the shift in position occurs, the peripheral surfaces of the liquid crystal panel 11 are stopped by the step portions 30. Therefore, the liquid crystal panel 11 of the liquid crystal display device 10 is less likely to be placed on the distal end surfaces 23b of the positioning ribs 23 (i.e., end surfaces that faces the chassis 14). In the production process of the liquid crystal display device 10, cracks may occur in a part of the liquid crystal panel 11. With this configuration, the liquid crystal panel 11 is less likely to be placed on the positioning ribs 23. Therefore, such cracks are less likely to occur.

In the liquid crystal display device 10 of this embodiment, the light guide plate 16 includes the through holes 16s at portions that correspond to the step portions 30 in a plan view for passing the step portions 30. The step portions 30 are inserted in the respective through holes 16s of the light guide plate 16. Namely, the step portions 30 and the light guide plate 16 are fitted together. Therefore, the light guide plate 16 is positioned relative to the plate surface direction thereof (the X-Y plane direction).

In the liquid crystal display device 10 of this embodiment, the projection dimension of each step portion 30 is equal to or less than the thickness of the light guide plate 16. If the projection dimension of the step portion 30 is larger than the thickness of the light guide plate 16, the step portion 30 sticks out from the rear surface of the light guide plate 16 (i.e., from the opposed surface 16c) through the through hole 16s. In such a configuration, it is difficult to arrange the chassis 14 on the rear surface of the light guide plate 16. The step portions 30 of this embodiment are arranged within the through holes 16s. Therefore, the chassis 14 is easily arranged on the rear surface of the light guide plate 16. Furthermore, the step portions 30 do not affect the reduction of the thickness of the liquid crystal display device 10.

In the liquid crystal display device 10 of this embodiment, the projection dimension of each positioning rib 23 is the same as the sum of the thicknesses of the liquid crystal panel 11 and the optical member 15. According to this configuration, the distal end surfaces 23b of the positioning ribs 23 are in contact with the surface of the light guide plate 16 opposite the liquid crystal panel 11. Therefore, the light guide plate 16 is supported by the distal end surfaces 23b of the positioning ribs 23. As described earlier, for the reduction in thickness of the liquid crystal display device 10, the thickness of the optical member 15 is set to 1 mm, which is a considerably small thickness. Therefore, if the positioning ribs 23 do not include the step portions 30, the edges of the liquid crystal panel 11 is more likely to be placed on the positioning ribs 23. With the steps of the positioning ribs 23 in this embodiment, the liquid crystal panel 11 is less likely to be placed on the positioning ribs 23 although the thickness of the liquid crystal display device 10 is reduced.

In the liquid crystal display device 10 of this embodiment, the projection dimension of each step portion 30 is equal to or more than the thickness of the optical member 15. A shift in position of the liquid crystal panel 11 may occur during positioning of the liquid crystal panel 11 to the positioning ribs 23. If the thickness of the step portion 30 is too small, the liquid crystal panel 11 may be placed on the step portions 30. According to the configurations of this embodiment, the liquid crystal panel 11 on the step portions 30 is less likely to be placed on the step portions 30.

In the liquid crystal display device 10 of this embodiment, the liquid crystal panel 11 has a rectangular shape in a plan view. Each of the positioning ribs 23 and the step portions 30 has a square block-like shape. The positioning ribs 23 and the step portions 30 project such that the inner surfaces 23a and 30a are parallel to the corresponding edges of the liquid crystal panel 11 (i.e., the opposing portion 25). With this configuration, the inner surfaces 23a of the positioning ribs 23 and the edges of the liquid crystal panel 11 are parallel to each other and in contact with each other. Therefore, the liquid crystal panel 11 is positioned with respect to the positioning ribs 23 with high accuracy.

The liquid crystal display device 10 of this embodiment includes multiple positioning ribs 23. Therefore, in the production process of the liquid crystal display device 10, the liquid crystal panel 11 is properly positioned.

Second Embodiment

A second embodiment will be described with reference to the drawings. The second embodiment includes positioning ribs 123 having different configurations from the first embodiment. Other configurations are similar to the first embodiment. Similar configurations, operations, and effects to the first embodiment will not be described. In FIG. 13, portions indicated by numerals including the reference numerals in FIG. 8 with 100 added thereto have the same configurations as the portions indicated by the respective reference numerals in the first embodiment.

In the liquid crystal display device according to the second embodiment, as illustrated in FIG. 13, each positioning rib 123 has an elongated block-like shape that extends along a corresponding panel holddown portion 113a. The panel holddown portions 113a include the positioning ribs 123, respectively. Each positioning rib 123 has a length equal to a length of the corresponding panel holddown portion 113a. Namely, the positioning ribs 123 together take a frame-like shape and edge areas of the light guide plate 216 are held down with distal end surfaces 123b of the frame-like shaped positioning ribs 123 from the front side for an entire periphery thereof. The positioning ribs 123 taking such a shape include a total of six step portions 130. The step portions 130 are located at positions corresponding to the positions of the positioning ribs 123 of the first embodiment, respectively. With the positioning ribs 123 having such configurations, peripheral surfaces of a liquid crystal panel are positioned with respect to the respective positioning portions in the production process of the liquid crystal display device. Therefore, the liquid crystal panel is properly positioned.

Third Embodiment

A third embodiment will be described with reference to the drawings. The third embodiment includes a different number of step portions 230 from the first embodiment. Other configurations are similar to the first embodiment. Similar configurations, operations, and effects to the first embodiment will not be described. In FIG. 14, portions indicated by numerals including the reference numerals in FIG. 8 with 200 added thereto have the same configurations as the portions indicated by the respective reference numerals in the first embodiment.

As illustrated in FIG. 14, the liquid crystal display device according to the second embodiment include positioning ribs 223 that have two step portions 230, respectively. The configurations and the arrangements of the positioning ribs 223 are similar to the first embodiment. With the step portions 230 that arranged as described above, even if a shift in the position of the liquid crystal panel occurs during the production process of the liquid crystal display device, the peripheral surfaces of the liquid crystal panel are more likely to come into contact with the inner surfaces of the step portions 230. Therefore, the liquid crystal panel is less likely to be placed on the positioning ribs 230.

Modifications of the above embodiments will be listed below.

(1) In the above embodiments, the step portions are arranged at portions of the distal end surfaces of the positioning ribs. However, the step portions may be arranged along the respective inner surfaces of the positioning ribs. With this configuration, inner surfaces of the step portions have wider dimensions, respectively. Therefore, in the production process of the liquid crystal display device, moving of the display panel on the positioning ribs 23 is properly reduced.

(2) In the above embodiments, the liquid crystal display device includes the edge-light type backlight. However, the liquid crystal display device may include a direct type backlight unit.

(3) In the above embodiments, the liquid crystal display device does not include a cabinet. However, the liquid crystal display device may include a cabinet.

(4) The configurations, the arrangements, the shapes, and the number of the step portions can be modified as appropriate.

(5) The configurations, the arrangements, and the number of the positioning ribs can be modified as appropriate.

(6) In the above embodiments, the liquid crystal display device including the liquid crystal panel as the display panel is used. However, the aspect of this invention can be applied to display devices including other types of display panels.

The above embodiments described in detail are only examples and the scope of the claimed invention is not limited to the embodiments. The technical scope of the claimed invention includes various modifications of the above embodiments.

The technical elements described in this specification and the drawings may be used independently or in combination to achieve the technical benefits. The combinations are not limited to those in claims. With the technologies described in this specification and the drawings, multiple objectives may be accomplished at the same time. However, the technical benefits can be achieved by accomplishing even only one of the objectives.

EXPLANATION OF SYMBOLS

TV: television device, LDU: liquid crystal display unit, PWB: power board, MB: main board, CTB: control board, CV: cover, ST: stand, LU: LED unit, 10: liquid crystal display device, 11: liquid crystal panel, 12: backlight device, 13: frame, 14: chassis, 15: optical member, 16: light guide plate, 16: insertion hole, 20: reflection sheet, 23, 123, 223: positioning rib, 25: opposed portion, 30, 130, 230, 330: step portion.

The invention claimed is:

1. A display device comprising:
   a light source;
   a display panel configured to provide a display using light from the light source;
   a chassis arranged on an opposite side of the display panel from a display surface of the display panel;
   a frame arranged on a display surface side of the display panel and holding at least the display panel and the light source between the frame and the chassis;
   a positioning portion having a block-like shape, projecting from the frame toward the chassis, and including a peripheral surface opposite a peripheral surface of the display panel to position the display panel relative to a display surface direction;
   a step portion projecting from a portion of a distal end surface of the positioning portion toward the chassis so as to form a step and including a peripheral surface opposite the peripheral surface of the display panel, the peripheral surface of the step portion being on a same plane with the peripheral surface of the positioning portion that is opposite the peripheral surface of the display panel; and
   a light guide plate arranged over an opposite surface of the display panel to the display surface, including a peripheral surface opposite the light source, configured to guide the light from the light source toward the display panel, and including a through hole in a portion corresponding to the step portion in a plan view, wherein the step portion is arranged in the through hole.

2. The display device according to claim 1, wherein a projecting dimension of the step portion is no more than a thickness of the light guide plate.

3. The display device according to claim 1, further comprising an optical member sandwiched between the display panel and the light guide plate, wherein
   a projection dimension of the positioning portion is equal to a sum of a thickness of the display panel and a thickness of the optical member.

4. The display device according to claim 3, wherein a projecting dimension of the step portion is no less than a thickness of the optical member.

5. The display device according to claim 1, wherein
   the display panel has a square shape in a plan view, and
   each of the positioning portion and the step portion has a rectangular block-like shape and projects such that the peripheral surface of each of the positioning portion and the step portion is parallel to the peripheral surface of the display panel.

6. The display device according to claim 1, wherein the positioning portion includes a plurality of positioning portions.

7. The display device according to claim 6, wherein the positioning portions are arranged adjacent to peripheral surfaces of the display panel.

8. The display device according to claim 6, wherein the positioning portion includes the plurality of step portions.

9. The display device according to claim 1, wherein the display panel is a liquid crystal display panel including liquid crystals.

10. A television device comprising the display device according to claim 1.

* * * * *